United States Patent
Dekker

[11] Patent Number: 6,037,896
[45] Date of Patent: Mar. 14, 2000

[54] METHOD FOR DETERMINING AN IMPACT POINT OF A FIRED PROJECTILE RELATIVE TO THE TARGET

[75] Inventor: Jacob Eelke Dekker, Borne, Netherlands

[73] Assignee: Hollandse Signaalapparaten B.V., Hengelo, Netherlands

[21] Appl. No.: 09/147,797

[22] PCT Filed: Sep. 9, 1997

[86] PCT No.: PCT/EP97/04956

§ 371 Date: Mar. 10, 1999

§ 102(e) Date: Mar. 10, 1999

[87] PCT Pub. No.: WO98/11452

PCT Pub. Date: Mar. 19, 1998

[30] Foreign Application Priority Data

Sep. 13, 1996 [NL] Netherlands .......................... 1004025

[51] Int. Cl.[7] .................................................. G01S 13/72

[52] U.S. Cl. ................................................ 342/119; 342/96

[58] Field of Search ................................ 342/59, 75, 76, 342/80, 96, 119

[56] References Cited

U.S. PATENT DOCUMENTS

| 4,489,331 | 12/1984 | Salvat et al. | 343/753 |
| 4,743,907 | 5/1988 | Gellekink | 342/59 |
| 5,477,224 | 12/1995 | Sinnock | 342/139 |

*Primary Examiner*—Ian J. Lobo
*Attorney, Agent, or Firm*—Oblon, Spivak, McClelland, Maier & Neustadt, P.C.

[57] ABSTRACT

The method of determining an impact point of a fired projectile relative to a target. The target is first tracked with the first beam. In the meantime, a second beam is directed above the target and waits for the projectile to be situated within the beam. The projectile's impact point is subsequently predicted by extrapolating the measuring data from the second beam.

20 Claims, 3 Drawing Sheets

METHOD FOR DETERMINING AN IMPACT POINT OF A FIRED PROJECTILE RELATIVE TO THE TARGET

BACKGROUND OF THE INVENTION

1. Field of the Invention

The invention relates to a method for determining an impact point of a fired projectile relative to a target. More specifically, reference is made in this context to gunfired projectiles.

2. Discussion of the Background

When firing projectiles, it is of importance to ascertain the position where the projectile will come down or hit, for instance for comparing this position with a previously predicted point, the predicted hitting point (PHP). The firing direction of a subsequent projectile can then be adjusted, which procedure is known as In Action Calibration (IAC). Besides, it is often important to provide an indication of the distance by which the projectile misses the target, the so-called Miss Distance Indication (MDI).

It is customary to determine the impact point by means of a search radar system. Particularly in case of applications in a maritime environment, for instance at sea, the projectile position is measured at the moment that it hits the water and detonates. This causes a column or splash of water in an upward direction. On land, projectile detonation will cause a dust cloud. The splash or dust cloud can be registered by the search radar, thus enabling the impact point to be determined.

The drawback of such a method is that the splash is relatively poorly visible on radar displays. Since the target usually produces a very strong echo compared to the splash, the radar echo produced by the splash will sometimes even be eclipsed by the radar echo produced by the target. If the projectile impact occurs close to the target, the limitation of the radar resolution and the radar system's limited dynamic range exclude the possibility of distinguishing between target and splash and among the splashes. Besides, state-of-the-art search radar systems provided with TWT (Travelling Wave Tube) transmitters emit long pulses. When processing received echoes, this causes time side lobes which manifest themselves in a reduced range resolution. A second drawback of a search radar system is the comparatively low update rate of target and splash measurements. In addition, it is difficult, in case of a plurality of splashes caused by separate projectiles, to coordinate, per search radar revolution, the measurements pertaining to a single splash, which is partly due to the fact that not all splashes produce equally strong radar echoes.

However, naval ships are as a rule also provided with tracking radar systems, usually comprising transmitters for generating short pulses, particularly suitable for air target tracking. This ensures a good resolution. Moreover, tracking radars have a far higher update rate.

SUMMARY OF THE INVENTION

The object of the method according to the invention is to eliminate the above drawbacks by using the already available tracking radar systems.

The method is thereto characterized by:
tracking the target with the aid of a first radar beam;
directing a second radar beam above the target;
waiting for the projectile to be present in the second radar beam;
determining the impact point on the basis of measuring data of the second radar beam.

An advantageous embodiment of the method according to the invention is characterized in that the second radar beam is narrower than the first radar beam, for instance by using a higher transmit frequency at the same antenna dimensions. This reduces the susceptibility of the second beam to the well-known image effect with respect to the projectile echoes. The image effect occurs when the echo of the target is reflected by the earth surface and the reflected echo is received in the radar antenna, interfering with the true target echo. As a result, the altimeter measurement of the projectile is disturbed or even rendered useless. A further advantage is that the projectile's azimuth, elevation and range can be more accurately determined. A still further advantage is that it can thus be arranged that the projectile is illuminated by the second radar beam, whereas the target is not, which precludes the target from generating a disturbing echo.

BRIEF DESCRIPTION OF THE DRAWINGS

The invention will now be explained in greater detail with reference to the following figures, of which.

DETAILED DESCRIPTION OF THE PREFERRED EMBODIMENTS

Figure 1:
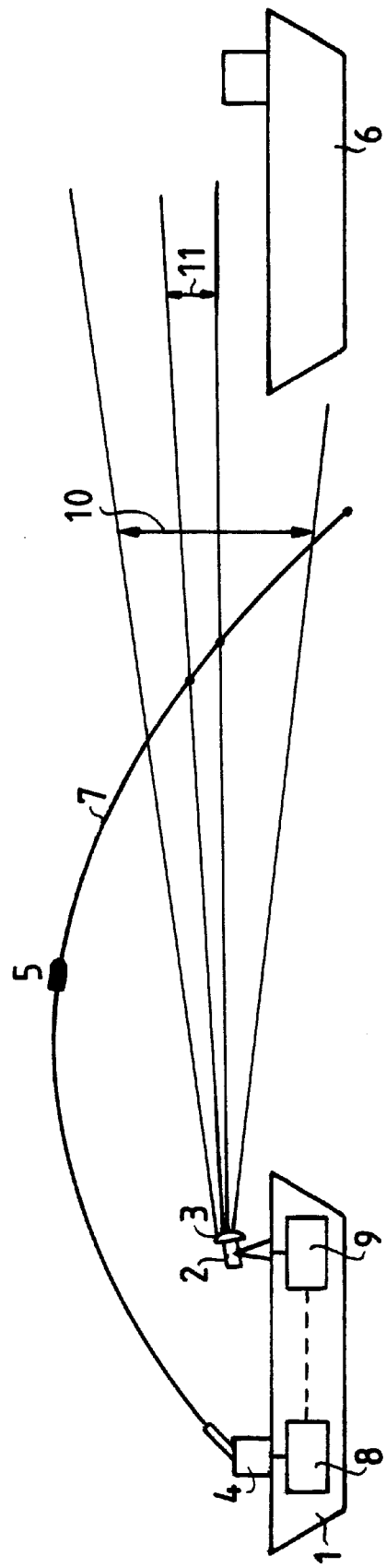
FIG. 1 represents a configuration in which the method can be applied.

FIG. 1 shows a ship 1 on which is mounted a tracking radar apparatus 2 provided with an antenna 3, and a gun system 4. Gun system 4 has fired a projectile 5 in the direction of a surface target 6. Projectile 5 follows a ballistic trajectory 7. Gun system 4 may for instance be of a 76 mm calibre. The gun system is controlled by fire-control computer 8, which may receive data from track computer 9 connected to tracking radar apparatus 2, although this is not strictly necessary. Tracking radar apparatus 2 provided with antenna 3 generates a first radar beam 10 and a second radar beam 11 and is directed at surface target 6. The second radar beam 11 preferably operates in a higher frequency band than the first radar beam 10 and is consequently narrower. This practically eliminates the susceptibility to the image effect in the second beam. A most suitable frequency band choice is the I-band (8 GHz–9.5 GHz) for the first beam 10 and the Ka-band (34.5 GHz–35.5 GHz) for the second beam 11, beamwidth approximately 8 mrad, which renders the second radar beam 11 practically insusceptible to echoes produced by the surface target. Because the first and the second radar beam are generated by a single antenna 3, their movements are coupled. However, the antenna may also have been designed such that the second beam can be turned relative to the first beam, thus allowing a certain measure of independence, although this is not strictly necessary. Besides the preferred embodiment incorporating a single antenna, it is also possible to employ two independently operating tracking radars, one for the generation of the first radar beam and the other for the generation of the second radar beam. The preferred embodiment, however, affords a saving since it comprises only one antenna.

According to the time-sharing principle, the second and first beam could be generated alternately, enabling both beams to be generated by means of one transmitter and antenna.

Figure 2:
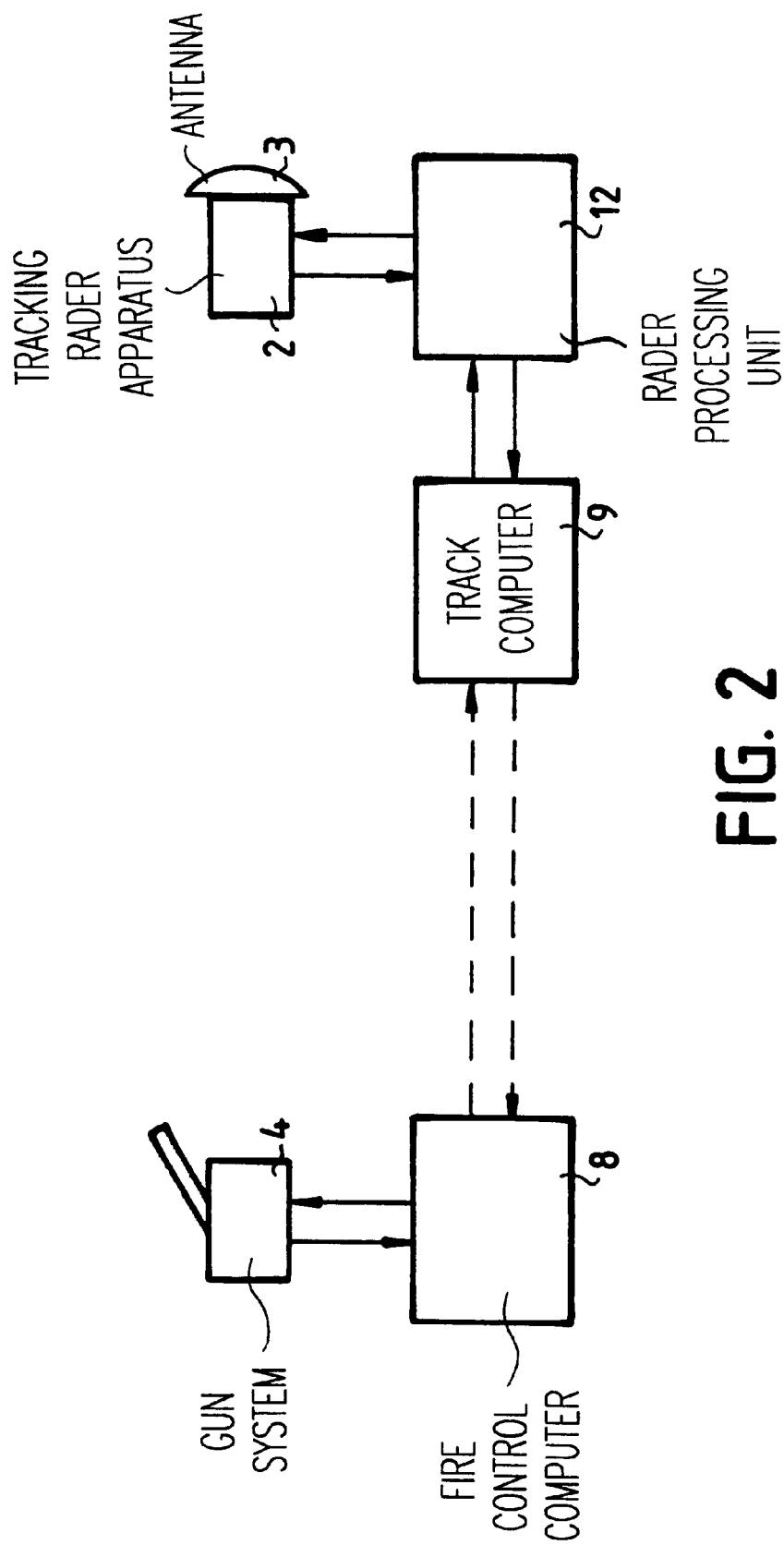
FIG. 2 schematically represents a track computer in which the method described is implemented.

FIG. 2 represents the naval fire-control configuration shown in FIG. 1 in greater detail. Radar processing unit 12, suitable for the detection of moving targets, receives target data from tracking radar apparatus 2 and, on the basis of these data, aligns the tracking radar apparatus in the correct position. Radar processing unit 12 is furthermore connected to track computer 9 for constructing a track of each target. The track computer is designed to control fire-control computer 8. Alternatively, fire-control computer 8 can be controlled through the intermediary of an operator, who proceeds on the basis of data supplied by the track computer.

Figure 3:
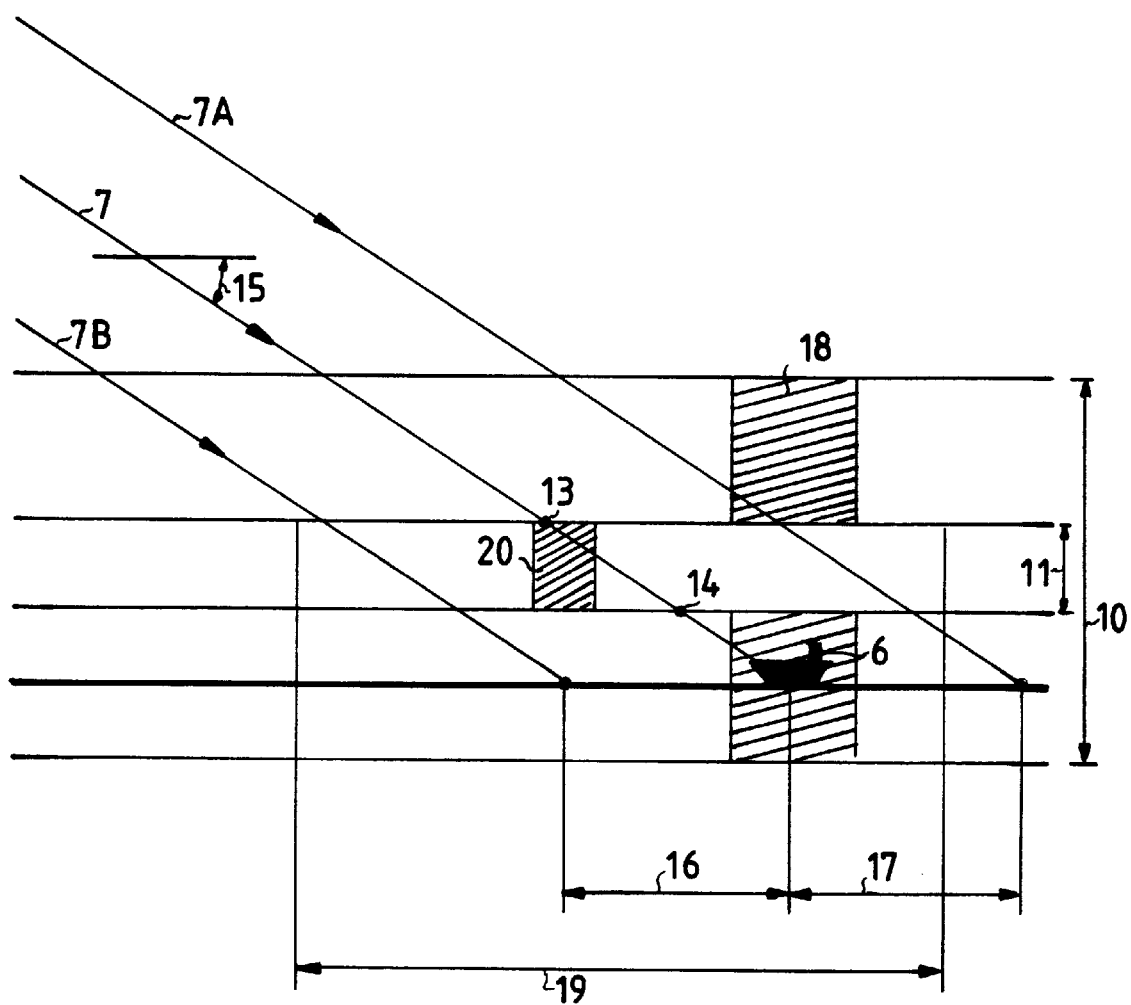
FIG. 3 provides a detailed representation of the configuration of FIG. 1 at the position of the target.

FIG. 3 provides a detailed representation of the configuration of FIG. 1 at the position of surface target 6. Also shown are the ranges 7A and 7B, between which the projectile trajectory 7 might be present. The projectile enters the second radar beam 11 at point 13 and leaves the beam at point 14. Starting from point 14, an impact point is predicted on the basis of ballistic data and the locally measured projectile position in three dimensions. The ballistic data comprise an angle of impact 15, for instance predicted on the basis of a firing table as well as the projectile's final velocity and final acceleration. The miss distance with respect to target 6 is subsequently determined on the basis of the measured target position and the predicted impact point. In the example of the embodiment, this impact point coincides with target 6 and the predicted miss distance is zero. The miss distances for the alternative projectile trajectories 7A and 7B are indicated by the dimension lines 16 and 17.

In the example of the embodiment, tracking radar 2 is connected to radar processing unit 12 which, in turn, is connected to track computer 9. Using the first radar beam 10, surface target 6 is tracked within a first tracking gate 18 which, in the example of the embodiment, has a length of 300 m. The first radar beam has a width of 250 m at the position of the surface target. In this example, the distance between the surface target and the ship is 8000 m. The second radar beam 11 is, for instance on the basis of an activation signal from track computer 9, directed above surface target 6, in the example of the embodiment between 0.5 and 1.0 degrees, dependent on the target range. In the example of the embodiment, the second radar beam has a width of approximately 60 m at the position of surface target 6. The first radar beam 10 is sufficiently wide to continue tracking surface target 6. At a given point of time, the previously fired projectile 5 appears in the second radar beam, which in FIG. 3 is indicated by point 13. The final velocity is then for instance approximately 300 to 500 m/s, the angle of impact 15 is for instance approximately 16 degrees. Radar processing unit 12, connected to tracking computer 9 detects the projectile by registering and selecting, within an acquisition gate 19 for the second radar beam 11 in the vicinity of the surface target, target echoes in a manner known in the art on the basis of doppler spectral components. In the example of the embodiment, this is realized by the emission of bursts of radar transmit pulses and by the detection, per burst, of a possible echo. If within acquisition gate 19 at least twice consecutively an echo is detected, having at least substantially the same range and doppler spectral components, a projectile will be detected at a sufficiently low false alarm rate. In the example, the acquisition gate 19 has an approximate length of 1000 m. Subsequently, the projectile is tracked by fixing in range, in radar processing unit 12, a tracking gate 20 at the position of the projectile echo; i.e. point 13. Tracking gate 20 accordingly moves along with the projectile echo. In the example of the embodiment, radar processing unit 12 supplies a projectile position and velocity measurement to track computer 9. At this time, the projectile position is known in three dimensions. Moreover, the projectile has come within close proximity to the target. On the basis of target echoes of the second radar beam and ballistic data regarding the projectile, a prediction can be made as to projectile's impact point. At the moment 14 that no projectile measurements of a sufficient signal-noise ratio are received in the tracking gate in question, the radar processing unit 12 stops the projectile measurements.

At that moment, the projectile obviously left the second radar beam, usually 200 to 300 m before the spot where the projectile will hit the target or the water. In an advantageous embodiment, which allows the detection of several projectiles fired in succession, the radar processing unit stops the projectile measurements as soon as a subsequent projectile is detected twice with the same range and doppler, whereupon this projectile is taken into track. Track computer 9 then predicts the future trajectory of the projectile that is no longer tracked. It is also possible to track a plurality of projectiles simultaneously, provided that the track computer is arranged to this end.

The prediction as to the impact point can from point 14 be made through extrapolation. This prediction is far more accurate than a prediction based only on initial velocity during firing and ballistic data of the projectile, as the projectile position is known in the final stage of its trajectory. It will not be necessary to track the projectile during its entire trajectory. The track computer can now pass the difference between the calculated impact point and the predicted hitting point, taking account of their different time validities, the so-called IAC data, to the fire-control computer 8 for in-action calibration. On the basis of this, the fire-control computer can re-adjust the firing direction of subsequent projectiles. It is furthermore possible to present the calculated impact point along with the target 6, likewise taking account of their relative time validities, on a display unit to enable miss-distance indication (MDI).

The application of the method according to the invention is by no means limited to the described configuration, but is also suitable for other projectile calibers, other transmit frequencies for the radar beams or differently selected tracking and acquisition gates, etc. The projectiles may comprise missiles. The example of the embodiment concerns a naval configuration, although the method is also suitable for application in land-based configurations.

The first and second radar beam can also be generated by a first and a second radar apparatus. The first beam then serves to track the target, whereas the second beam is directed right above the target. The second beam can then be controlled in azimuth on the basis of track data pertaining to the first beam. This allows the second beam to be generated by a comparatively simple radar.

In a feasible embodiment, the first and the second radar beam comprise a single radar beam, the main lobe of which is directed above the target, such that the image effect, at least with respect to the projectile echoes, is virtually unnoticeable or even absent. This may be accomplished with a suitably selected radar frequency. The target shall still be present in the lower section of the radar beam's main lobe or in the side lobe, so that the target can be detected and tracked. This is possible because the target usually produces a far stronger echo than the projectile. The same single radar beam can then be used to detect the projectile and predict the impact point in a manner described above.

I claim:

1. Method for determining an impact point of a fired projectile relative to a target, characterized by:

tracking the target with the aid of a first radar beam;

directing a second radar beam above the target;

waiting for the projectile to be present in the second radar beam;

determining the impact point on the basis of measuring data of the second radar beam.

2. Method as claimed in claim 1, characterized in that, in order to determine the impact point use is made of ballistic data of the projectile.

3. Method as claimed in claims 1, characterized in that the second radar beam is narrower than the first radar beam.

4. Method as claimed in claim 1, characterized in that the first radar beam and the second radar beam are generated by a single antenna with radar means connected thereto.

5. Method as claimed in claim 1, characterized in that the first radar beam operates in the I-band and the second radar beam in the Ka-band.

6. Method as claimed in claim 1, characterized in that the projectile is fired from a ship and the first and second radar beam are generated on the same ship.

7. Method as claimed in claim 1, characterized in that, if the projectile is present within the second radar beam, the second radar beam first acquires the projectile within an acquisition gate and subsequently tracks the projectile within a tracking gate that is considerably smaller than the acquisition gate.

8. Method as claimed in claim 1, characterized in that a firing direction of the projectile is adjusted on the basis of the predicted impact point.

9. System for determining an impact point of a fired projectile relative to a target, comprising a radar processing unit, a first radar apparatus for generating a first radar beam and a second radar apparatus for generating a second radar beam, characterized in that:

the radar processing unit is connected to the first and the second radar apparatus;

the radar processing unit is designed to align the first radar apparatus such that the target is situated in the first radar beam;

the radar processing unit is designed to align the second radar apparatus such that the second radar beam is directed right above the target;

the radar processing unit is designed to detect a position of a projectile or similar object in flight, as soon as it enters the second radar beam;

the radar processing unit is designed to predict an impact point of the projectile on the basis of the detected projectile position.

10. System for determining an impact point of a fired projectile relative to a target, comprising a radar processing unit and a radar apparatus designed to generate a first radar beam and a second radar beam, characterized in that:

the radar processing unit is connected to the radar apparatus;

the radar processing unit is designed to align the radar apparatus such that the target is substantially situated in the first radar beam and the second radar beam is directed right above the target;

the radar processing unit is designed to detect a position of a projectile or similar object in flight, as soon as it enters the second radar beam;

the radar processing is designed to predict an impact point of the projectile on the basis of the detected projectile position.

11. Method as claimed in claim 2, characterized in that the second radar beam is narrower than the first radar beam.

12. Method as claimed in claim 2, characterized in that the first radar beam and the second radar beam are generated by a single antenna with radar means connected thereto.

13. Method as claimed in claim 3, characterized in that the first radar beam and the second radar beam are generated by a single antenna with radar means connected thereto.

14. Method as claimed in claim 2, characterized in that the first radar beam operates in the I-band and the second radar beam in the Ka-band.

15. Method as claimed in claim 3, characterized in that the first radar beam operates in the I-band and the second radar beam in the Ka-band.

16. Method as claimed in claim 4, characterized in that the first radar beam operates in the I-band and the second radar beam in the Ka-band.

17. Method as claimed in claim 2, characterized in that the projectile is fired from a ship and the first and second radar beam are generated on the same ship.

18. Method as claimed in claim 3, characterized in that the projectile is fired from a ship and the first and second radar beam are generated on the same ship.

19. Method as claimed in claim 4, characterized in that the projectile is fired from a ship and the first and second radar beam are generated on the same ship.

20. Method as claimed in claim 5, characterized in that the projectile is fired from a ship and the first and second radar beam are generated on the same ship.

* * * * *